(12) United States Patent
Ando

(10) Patent No.: US 9,036,139 B2
(45) Date of Patent: May 19, 2015

(54) OPTICAL CHARACTERISTIC MEASUREMENT APPARATUS

(75) Inventor: Toshinori Ando, Inagi (JP)

(73) Assignee: CANON KABUSHIKI KAISHA (JP)

( * ) Notice: Subject to any disclaimer, the term of this patent is extended or adjusted under 35 U.S.C. 154(b) by 413 days.

(21) Appl. No.: 13/435,069

(22) Filed: Mar. 30, 2012

(65) Prior Publication Data

US 2012/0250009 A1   Oct. 4, 2012

(30) Foreign Application Priority Data

Apr. 4, 2011 (JP) ................................. 2011-082796

(51) Int. Cl.
| | |
|---|---|
| *G01B 9/00* | (2006.01) |
| *G01M 11/00* | (2006.01) |
| *G01J 11/00* | (2006.01) |
| *G01B 9/08* | (2006.01) |
| *G01M 11/02* | (2006.01) |

(52) U.S. Cl.
CPC ................................. *G01M 11/0257* (2013.01)

(58) Field of Classification Search
USPC .................... 356/124–127, 239.1–239.8, 515
See application file for complete search history.

(56) References Cited

U.S. PATENT DOCUMENTS

| | | | | |
|---|---|---|---|---|
| 5,067,811 | A | * | 11/1991 | Ouchi ........................... 356/121 |
| 5,172,392 | A | * | 12/1992 | Boisselier ..................... 372/107 |
| 5,748,110 | A | * | 5/1998 | Sekizawa et al. ................. 341/5 |
| 5,914,777 | A | * | 6/1999 | Imura ........................... 356/121 |
| 6,052,180 | A | * | 4/2000 | Neal et al. ..................... 356/121 |
| 6,151,109 | A | * | 11/2000 | Bromssen et al. ............ 356/121 |
| 6,339,469 | B1 | * | 1/2002 | Bruel et al. .................... 356/121 |
| 6,535,278 | B1 | * | 3/2003 | Imura .............................. 356/73 |
| 6,809,829 | B1 | | 10/2004 | Takata et al. |
| 6,856,387 | B2 | * | 2/2005 | Bruel ............................ 356/121 |
| 6,925,140 | B2 | * | 8/2005 | Bruder ............................. 378/4 |

(Continued)

FOREIGN PATENT DOCUMENTS

| | | |
|---|---|---|
| CN | 1274839 A | 11/2000 |
| CN | 101303269 A | 11/2008 |

(Continued)

OTHER PUBLICATIONS

Official Action issued in CN201210094553.9 mailed Aug. 19, 2014. English translation provided.

*Primary Examiner* — Kara E Geisel
*Assistant Examiner* — Jarreas C Underwood
(74) *Attorney, Agent, or Firm* — Rossi, Kimms & McDowell LLP

(57) ABSTRACT

An optical characteristic measurement apparatus acquires a measurement value pertaining to an image characteristic of an optical system to be tested on a plurality of evaluation planes, and measures an optical characteristic, comprising a measurement value correction unit correcting a measurement value pertaining to a width or a light intensity of one of a line spread distribution and a point spread distribution of a beam, on the evaluation planes, wherein: in case where the measurement value pertains to the width, the image plane is regarded as an evaluation reference plane, and the measurement value correction unit outputs a corrected value; in case where the measurement value pertains to the light intensity, the image plane is regarded as an evaluation reference plane, and the measurement value correction unit also outputs a corrected value; and the optical characteristic of the optical system to be tested is measured based on the corrected value.

19 Claims, 5 Drawing Sheets

(56) References Cited

U.S. PATENT DOCUMENTS

| | | |
|---|---|---|
| 7,839,733 B2 * | 11/2010 | Nakai ............... 369/44.32 |
| 2004/0218186 A1 * | 11/2004 | Viol ..................... 356/450 |
| 2008/0281556 A1 | 11/2008 | Matsuzawa |
| 2009/0027575 A1 * | 1/2009 | Miyauchi et al. .......... 349/5 |
| 2009/0268181 A1 | 10/2009 | Tezuka et al. |
| 2012/0248327 A1 * | 10/2012 | Bolshukhin et al. ...... 250/397 |

FOREIGN PATENT DOCUMENTS

| | | |
|---|---|---|
| JP | 7-120691 A | 5/1995 |
| JP | 2002170754 A | 6/2002 |
| JP | 2004014907 A | 1/2004 |
| JP | 2007-163227 A | 6/2007 |
| KR | 1020090112584 A | 10/2009 |

* cited by examiner

OPTICAL CHARACTERISTIC MEASUREMENT APPARATUS

BACKGROUND OF THE INVENTION

1. Field of the Invention

The present invention relates to an optical characteristic measurement apparatus for recognizing the best image plane position from the defocus characteristic of an optical system to be tested.

2. Description of the Related Art

In every optical field irrespective of a specific field to which an optical system is applied, an image condition is observed while moving a camera in the optical axis direction in proximity to a target image plane of an optical system to be tested, in order to measure the focusing position and the focal depth performance of the optical system to be tested. The measurement allows recognition of the difference between the best image plane position and the target image plane position of the optical system to be tested, and enables the difference to be reduced by correcting the shapes of components and adjusting the positions according to the value, as necessary. Instead thereof or in addition thereto, the measurement enables the appropriateness of depth allowance amount for variation in focal position caused by variation in temperature and a mechanical error caused by assembling into a higher unit or a product to be determined.

For instance, Japanese Patent Application Laid-Open No. 2007-163227 discloses an apparatus for measuring the performance of a laser scanning optical system. This apparatus has a configuration that can arbitrarily, automatically change a relative separation between a jig for measuring an optical characteristic on which an optical system to be tested is mounted and a beam measurement unit configured by a CCD camera. This document also discloses testing of the depth allowance amount of a scanning lens by measuring a depth characteristic, which is referred to as depth curve.

Japanese Patent Application Laid-Open No. H07-120691 describes variation in a beam spot diameter with respect to a defocus amount, which is a distance from a target image plane position, and discloses that asymmetric characteristics are exhibited according to positive or negative variation in distance.

In the case of evaluating the defocus characteristic of the optical system to be tested while varying one of the distance between an object and the optical system to be tested and the distance between the optical system to be tested and an evaluation apparatus, such as a screen and a camera, a following problem is caused. This problem is that, if the defocus amount is large with respect to the distance between the pupil of the optical system to be tested and an evaluation reference plane, it is difficult to determine the true best image plane position. The center of a region smaller than a region with an allowable spot diameter is typically adopted as the best image plane position. Unfortunately, the best image plane position varies with variation in value of the allowable spot diameter.

SUMMARY OF THE INVENTION

In order to solve the problem, according to the present invention, there is provided an optical characteristic measurement apparatus acquires a measurement value pertaining to an image characteristic of an optical system to be tested on a plurality of evaluation planes in proximity of an image plane of an object by the optical system to be tested, and measures an optical characteristic of the optical system to be tested based on each measurement value, comprising a measurement value correction unit correcting a measurement value pertaining to a width or a light intensity of one of a line spread distribution and a point spread distribution of a beam by the optical system to be tested, on the evaluation planes, wherein: in case where the measurement value pertains to the width of one of the line spread distribution and the point spread distribution of the beam, the image plane is regarded as an evaluation reference plane, and the measurement value correction unit outputs a corrected value such that when the evaluation plane approaches the optical system to be tested in comparison with the evaluation reference plane, the measurement value increases according to an approaching amount, and when the evaluation plane moves apart from the optical system to be tested in comparison with the evaluation reference plane, the measurement value decreases according to an amount of moving apart; in case where the measurement value pertains to the light intensity of one of the line spread distribution and the point spread distribution of the beam, the image plane is regarded as an evaluation reference plane, and the measurement value correction unit outputs a corrected value such that when the evaluation plane approaches the optical system to be tested in comparison with the evaluation reference plane, the measurement value decreases according to an approaching amount, and when the evaluation plane moves apart from the optical system to be tested in comparison with the evaluation reference plane, the measurement value increases according to an amount of moving apart; and the optical characteristic of the optical system to be tested is measured based on the corrected value having improved symmetry in comparison with the measurement value.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

It is an object of the invention of this application to provide an optical characteristic measurement apparatus that can acquire the best image plane position of an optical system to be tested easily and correctly (with a small error).

Embodiments of the present invention are hereinafter described with reference to diagrams.

First Embodiment

Overall Configuration of Apparatus

Figure 1:
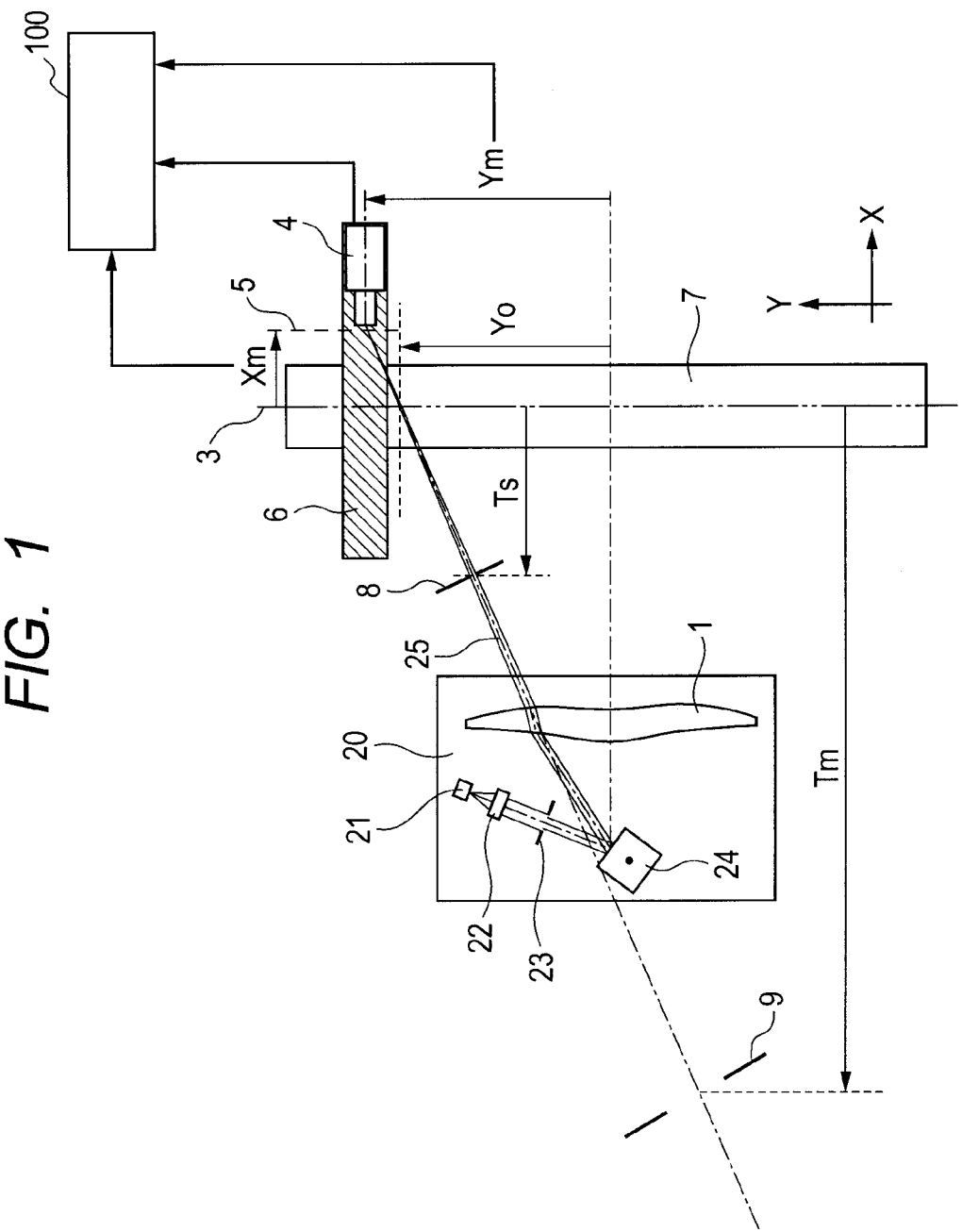
FIG. 1 is a schematic diagram illustrating a configuration of an optical characteristic measurement apparatus according to an embodiment of the present invention.

FIG. 1 illustrates an embodiment of application to an optical characteristic measurement apparatus of a laser scanning optical system. In this diagram, the X direction is referred to as a defocus direction, and the Y direction is referred to as an image height direction. For representation of characteristics of an optical system to be tested, the center line of a beam is referred to as a principal ray. A direction that includes the principal ray and is parallel to the plane of this sheet is referred to as a main scanning direction. A direction perpendicular to the plane of the sheet is referred to as a sub-scanning direction.

In FIG. 1, a lens 1 for laser scanning is an optical system to be tested. A measurement unit 20 includes the lens 1 for laser scanning and is a unit for measuring optical characteristics. The measurement unit 20 includes a semiconductor laser light source 21, as an object, and a light source optical system 22. The light source optical system 22 converts a divergent beam from the laser light source 21 into a substantially parallel beam in the main scanning direction, and a beam to be condensed in proximity to a reflection surface of an after-mentioned rotating polygon mirror in the sub-scanning direction.

A beam from the light source optical system 22 passes through a stop 23 for changing the cross sectional diameter of the beam to a predetermined diameter and a rotating polygon mirror 24 (hereinafter, referred to as a polygon mirror) that reflects the laser beam from the stop 23 and guides the beam to lens 1 for laser scanning at a predetermined angle. The passing beam exits as a beam 25 from the measurement unit 20.

A measurement value correction unit 100 will be described later. The configuration includes an electric circuit for controlling light emission of the laser light source 21, a motor for rotationally driving the polygon mirror 24 to a predetermined position, and a drive circuit therefore. However, these components are not related to the gist of the present invention. Accordingly, description thereof is omitted. An evaluation reference plane 3 is the image plane of the optical system to be tested. A camera 4 focuses on an evaluation plane 5 to observe and detect this evaluation plane. More specifically, the camera includes an objective lens and an image sensor.

The evaluation plane 5 is the focus plane of the camera 4 in this embodiment. A plurality of the evaluation planes 5 is provided in proximity of the image plane of an object by the optical system to be tested along the optical axis direction. Here, a position of each of the evaluation planes 5 is different from that of the others along the optical axis direction of the optical system.

Stages 6 and 7 are drive units in X and Y directions, respectively. These stages drive the camera 4 to the position Ym in the image height direction, and drive the evaluation plane 5 to the position Xm in the defocus direction according to an instruction from a non-illustrated control unit.

The image of the stop 23 that is formed by the optical system 1 to be tested between the stop 23 in the measurement unit 20 and the evaluation plane 5 is referred to as an exit pupil. In the case where the optical system 1 to be tested has anamorphic characteristics that includes the exit pupils at different positions in two directions orthogonal to each other, the respective exit pupils appear on sections in the main scanning direction (first direction) and the sub-scanning direction (second direction). The exit pupil 8 is in the sub-scanning direction. The exit pupil 9 is in the main scanning direction. These exit pupils 8 and 9 reside at respective distances Ts and Tm from the evaluation reference plane 3. Here, the distances Ts and Tm are defined such that the light beam propagation direction is positive.

Figure 2:
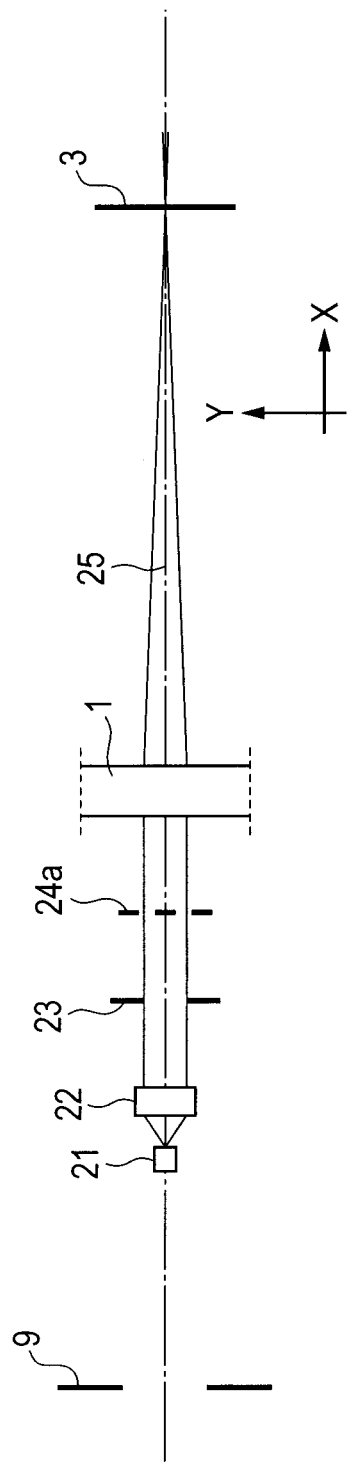
FIG. 2 is a sectional development diagram illustrating the optical characteristic measurement apparatus according to the embodiment in a main scanning direction.

In FIG. 1, the exit pupils 8 and 9 are on the side opposite to the evaluation reference plane 3 with respect to the light beam propagation direction. Accordingly, the distances Ts and Tm have negative values. FIG. 2 illustrates observation of a state where the optical path from the laser light source 21 to the evaluation reference plane 3 is expanded in the Z axis direction (the direction perpendicular to the sheet in FIG. 1). The cross section thereof is referred to as a main scanning cross section.

In FIG. 2, the reflection surface of the polygon mirror 24 is at a position 24a. Since other components are identical to the components in FIG. 1, the identical numerals are assigned thereto. In FIG. 2, a lens for laser scanning of the optical system 1 to be tested has a power that condenses a substantially parallel incident beam in proximity of the evaluation reference plane 3. Here, the image of the stop 23 formed by the lens for laser scanning, that is, the exit pupil of the main scanning cross section, is formed at the position 9.

Figure 3:
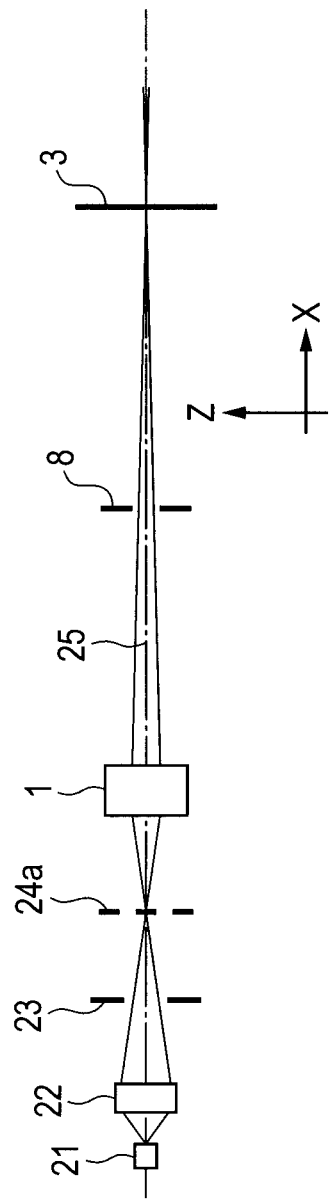
FIG. 3 is a sectional development diagram illustrating the optical characteristic measurement apparatus according to the embodiment in a sub-scanning direction.

FIG. 3 illustrates observation of a state where the optical path from the laser light source 21 to the evaluation reference plane 3 is expanded in a direction parallel to the XY plane. This cross section is referred to as a cross section in the sub-scanning direction. In FIG. 3, the lens for laser scanning of the optical system 1 to be tested has a power that further condenses, in proximity to the evaluation reference plane 3, the beam having been condensed in proximity to the polygon mirror surface 24a. Here, the image of the aperture of the stop formed by the lens for laser scanning, that is, the exit pupil on the cross section, is formed at the position 8.

Figure 8:
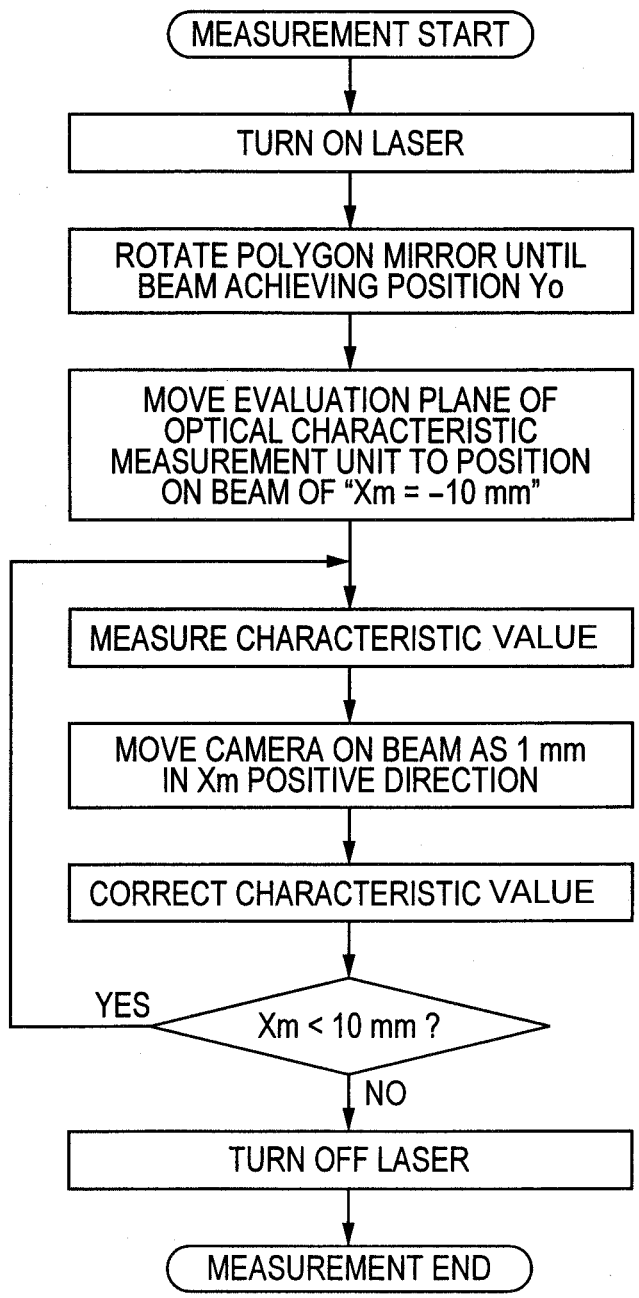
FIG. 8 is a diagram illustrating an operation sequence, which is executed by the measurement value correction unit 100, of the optical characteristic measurement apparatus according to the embodiment.

According to the above configuration, this embodiment performs following operations as illustrated in FIG. 8, which is a diagram showing the operation sequence of the optical characteristic measurement apparatus. That is, in this embodiment, for testing the lens 1 for laser scanning, which is the optical system to be tested, the defocus characteristic is acquired with one millimeter pitch at a predetermined image height within 10 mm ahead of and 10 mm behind of the reference evaluation plane 3.

First, the focus plane of the camera 4 is disposed at a desired image height Yo and a position of Xm=0, where Xm is the defocus amount from the reference evaluation plane 3, using the stages 6 and 7. Then, the laser light source 21 is turned on, and the polygon mirror is rotated such that the evaluation plane 5 is irradiated with the beam 25. The camera 4 is moved using the stages and the evaluation plane 5 is disposed along the beam 25 and at a position where Xm=−10 mm. Subsequently, the optical characteristic is measured.

Detection of Measurement Value

Figure 4A:
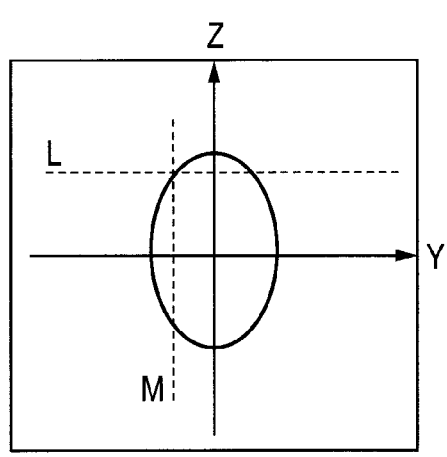
FIG. 4A is a diagram illustrating PSF measured by an optical characteristic measurement unit according to the embodiment.
Figure 4B:
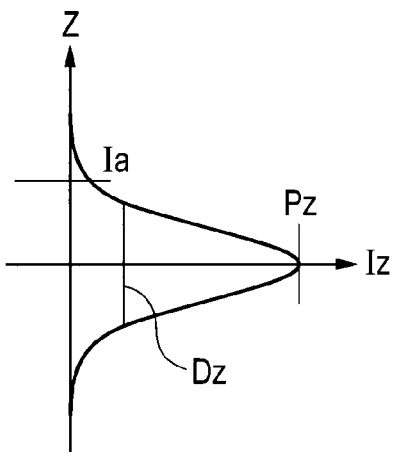
FIG. 4B is a diagram illustrating LSF measured by the optical characteristic measurement unit according to the embodiment.

Measurement of optical characteristics is described with reference to FIGS. 4A, 4B and 4C. FIG. 4A illustrate an image condition of the beam 25 recognized by the optical characteristic measurement apparatus, illustrating a distribution of intensity of the image spot on the Y-Z plane on the evaluation plane 5, and a point-spread function (hereinafter, abbreviated as PSF). FIG. 4B is a graph illustrating an image condition in the sub-scanning direction. The value in the Iz axis direction at each point is the total of intensities at points having the identical Z coordinate in FIG. 4A. This graph is referred to as a line-spread function (hereinafter, abbreviated as LSF) in the sub-scanning direction.

According to such processing, the LSF in FIG. 4B is unaffected by imaging characteristics in the orthogonal Y direction, and can correctly represent the imaging performance in the Z direction. FIG. 4C illustrates the maximum value Pz of LSF in the sub-scanning direction, and the width Dz of the graph where the value Iz is a predetermined value. In the case where the predetermined value is a half of Pz, Dz is referred to as a half-value width. In the case where the value is $1/e^2$, Dz is referred to as $1/e^2$ width.

The PSF corresponds to a point spread distribution acquired by a point input using a pinhole. The LSF corresponds to a line spread distribution acquired by a line input using a slit.

Figure 4C:
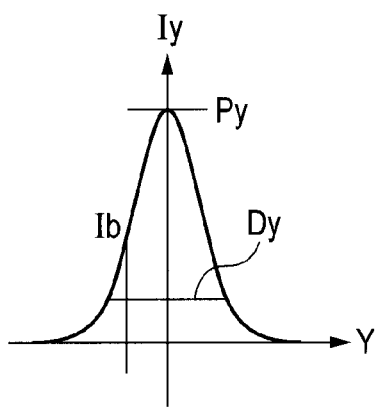
FIG. 4C is a graph illustrating an image condition in the main scanning direction according to the embodiment.

FIG. 4C is a graph illustrating an image condition in the main scanning direction in the image condition in FIG. 4A. The value at each point in the Iy axis direction is the total of intensities at points having the identical Y coordinate in FIG. 4A. This graph is referred to as LSF in the main scanning direction. In this embodiment, the optical characteristics are measured with $1/e^2$ widths Dy and Dz in the main and sub-scanning directions, respectively.

Correction of Measurement Value

This embodiment includes a measurement value correction unit 100, which can be a CPU, that corrects the measurement value as follows. That is, in this embodiment, after measurement of Dy and Dz, the measurement value is corrected according to the distance from the evaluation plane to the exit pupil. It is provided that the distances Tm and Ts are taken between the respective exit pupils in the main and sub-scanning directions and the evaluation reference plane 3 along the X axis. The distances Tm and Ts may actually be measured. If the distances do not largely vary owing to variation in the optical system to be tested, design values may be adopted. Provided that corrected values Dya and Dza correspond to the LSF widths in the main and sub-scanning directions, respectively, the corrected values with improved symmetry in comparison with the measurement values are calculated according to following calculating equations.

$$Dya = Tm/(Tm-Xm) \times Dy \quad (1)$$

$$Dza = Ts/(Ts-Xm) \times Dz \quad (2)$$

Provided that K is the distance from the evaluation reference plane to the exit pupil in main and sub-scanning directions, L is the distance from the exit pupil to the evaluation plane, Do is the measurement value before correction and D is the measurement value after correction, Conditional Equations (1) and (2) are represented in a following form.

$$D = (K/L) \times Do$$

This equation represents that the measurement value correction unit outputs values such that, when the evaluation plane 5 approaches the exit pupil, the corrected value increases with respect to the measurement value, while, when this plane moves away from the exit pupil, the corrected value decreases with reference to the measurement value.

Calculation Principle Concerning Correction

Figure 5:
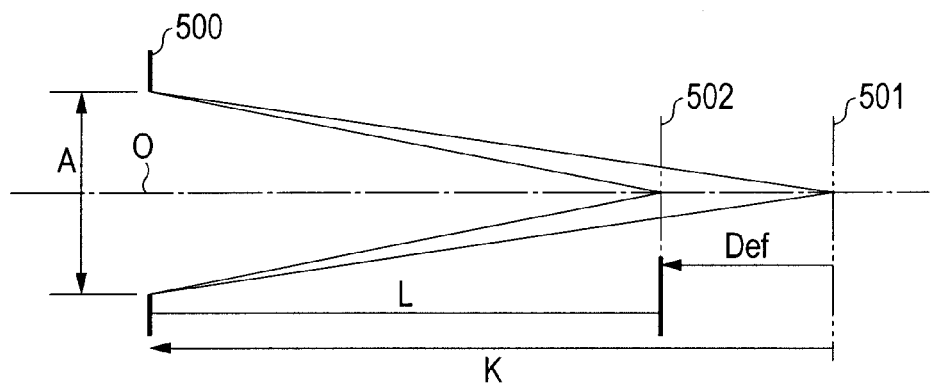
FIG. 5 is a diagram illustrating an exit pupil, an evaluation plane and an evaluation reference plane.

Hereinafter, a calculation principle concerning correction is described with reference to FIG. 5. FIG. 5 is a diagram illustrating the exit pupil, the evaluation plane and the evaluation reference plane. This diagram illustrates the exit pupil 500, the evaluation reference plane 501 and the evaluation plane 502. This diagram further illustrates the diameter A of the exit pupil, the distance T from the evaluation reference plane to the exit pupil along the optical path, and the defocus amount Def of the evaluation plane from the evaluation reference plane. Provided that the F number in view of the exit pupil from the evaluation reference plane is Fo, Fo=|T|/A. Provided that the F number in view of the exit pupil from the evaluation plane defocused by Def, Fd=|T−Def|/A.

For instance, one of the diffraction-limited image spot diameter and line width on each plane is proportional to the F number. Accordingly, these values on the evaluation plane 502 vary in comparison with the values on the evaluation reference plane, by $$Fd/Fo = (T-Def)/T \quad (3)$$

That is, the line width measured by the evaluation plane 502 is required to be evaluated in consideration that the diffraction-limited value at the point varies by Conditional Equation (3) from the value on the evaluation reference plane 501. Thus, the measurement value divided by Conditional Equation (3) is used for evaluation. In FIG. 5, the distances measured along the optical path are used as T and DEF. These values do not change if measurement is made along another direction. Accordingly, correct measurement can be made using Conditional Equations (1) and (2).

After the measurement and correction as described above, the camera 4 is moves by one millimeter in X direction along the beam 25 and similar measurement is performed, which is repeated for a predetermined times (e.g. ten times until Xm=10 mm). Instead, the measurement is repeated until LSF widths Dya and Dza in the main and sub-scanning direction after correction exceed a predetermined value.

Correction of Measurement Value in Sub-Scanning Direction

Figure 6:
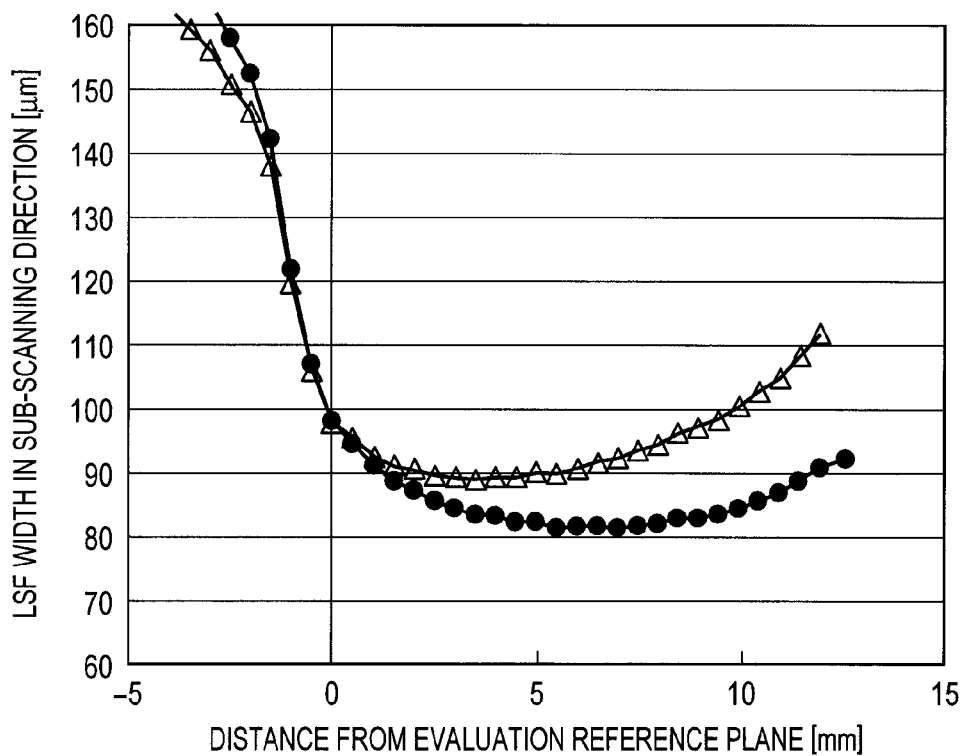
FIG. 6 is a diagram illustrating a measurement value before correction and a corrected value after the correction that pertain to the defocus characteristic of an LSF width.

FIG. 6 illustrates the thus acquired defocus characteristic of the line width in the sub-scanning direction. In FIG. 6, the abscissa axis represents a distance from the evaluation reference plane 3, the longitudinal axis represents LSF width in the sub-scanning direction, and points represented by black dots are corrected value after correction. Points represented by white triangle are measurement value before correction. Here, the exit pupil position Ts in the sub-scanning direction exists at a position of −50.3 mm (upstream of the image plane). As can be recognized qualitatively in FIG. 6, while the measurement value before correction exhibits asymmetric characteristics according to positive and negative of the defocus direction, the corrected value after correction exhibits good symmetry.

In quantitative view thereof, as to abscissa of FIG. 6, it is estimated that the focus plane is at a position of 3 to 4 mm based on the measurement values before correction, which is not good in symmetry. On the other hand, it can be confirmed that the best focus plane is at a position of 6 to 7 mm based on the corrected value after correction, which is good in symmetry. In this embodiment, it can be confirmed that the best focus plane is at the position of 6 to 7 mm but is not at a position of 0 mm. It is sufficient to correct the mold to change the best focus plane to 0 mm after confirmation of the best focus plane.

As to the ordinate of FIG. 6, as will be described below, the allowance is 80 μm in this embodiment. That is, in this embodiment, the laser wavelength is 80 nm and the exit F value in the sub-scanning direction on the evaluation reference plane is 63. Accordingly, as the LSF of a rectangle opening, $1/e^2$ width in the sub-scanning direction is about 80 μm. With respect to such allowance of 80 μm, according to the measurement value before correction, it is results in no depth at or below the allowance. On the other hand, according to the corrected value after correction, it can be allowed up to 88 μm, which is 10% larger than the original allowance of 80 μm.

To estimate the position of the best focus plane of the optical system to be tested, it is typical to evaluate the center position of a defocus range equal to or less than a threshold, which is one of the minimum line width and spot diameter increased by 10 to 20%. In this embodiment, based on the corrected value after correction, the best line width can be estimated as a value substantially identical to the design value. The width of depth to be the allowable line width can also be secured.

Correction of Measurement Value in Main Scanning Direction

The exit pupil position Tm in the main scanning direction is −300 mm. Correction in the main scanning direction as in the sub-scanning direction is performed using this value. However, with an allowable defocus range of about 10 mm, the correction according to Conditional Equation (1) is equal to or less than 5% (10/300). Accordingly, the evaluation may be performed only with correction in the sub-scanning direction without correction in the main scanning direction.

Second Embodiment

In the first embodiment, the measurement values are the LSF line widths in the main and sub-scanning directions. In this embodiment, the measurement values are the maximum intensities value Py and Pz of LSF in FIG. 4B. In the first embodiment, when the evaluation plane is provided in ahead of and behind of the reference plane as the image plane in the first embodiment to measure the beam width, correction is performed in consideration of the image magnification. On the other hand, in measurement of the light intensity of the beam, correction is performed using a correction coefficient that is a reciprocal of a correction coefficient pertaining to the beam width. This is because, in any defocus state, the integral value of light intensity, i.e. energy, is constant, and the product of the beam width and the light intensity of the beam is maintained constant.

Provided that Pya and Pza are LSF widths in the main and sub-scanning direction after correction, these values are corrected according to following equations.

$$Pya=(Tm-Xm)/Tm \times Py \quad (4)$$

$$Pza=(Ts-Xm)/Ts \times Pz \quad (5)$$

Provided that the distance from the evaluation reference plane to the exit pupil in the main and sub-scanning directions is K, the distance from the exit pupil to the evaluation plane is L, the measurement value is Do, and the measurement value after conversion is D, Conditional Equations (4) and (5) are represented in a following form.

$$D=(L/K) \times Do$$

Figure 7:
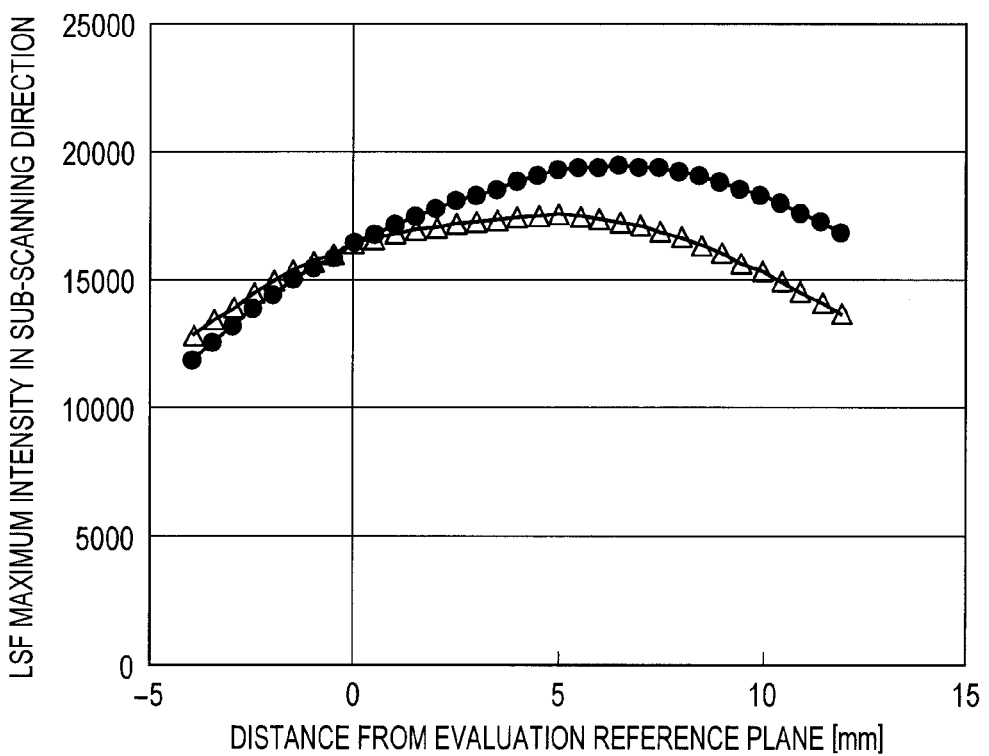
FIG. 7 is a diagram illustrating a measurement value before correction and a corrected value after the correction that pertain to the defocus characteristic of LSF maximum intensity.

FIG. 7 illustrates a measurement result of the maximum intensity value Py of the sub-scanning LSF. The measurement unit 20 and the optical system 1 to be tested that are identical to those in the first embodiment are used. In FIG. 7, the abscissa axis represents a distance from the evaluation reference plane 3, the longitudinal axis represents LSF maximum intensity in the sub-scanning direction, and points represented by black dots are corrected values pertaining to defocus characteristics of the LSF maximum intensity Py that have been corrected. Points represented by white triangle are measurement values pertaining to defocus characteristics before correction.

Third Embodiment

In the second embodiment, the measurement value is the maximum intensity of LSF. In this embodiment, the measurement value is the maximum intensity of PSF. In this embodiment, it is sufficient that correction of the light intensity of the beam which is inversely proportional to the correction of the beam diameter in the main and sub-scanning directions is performed simultaneously in the main and sub-scanning directions. That is, provided that Io is the measurement value before correction (maximum intensity of PSF) and Ia is the corrected value after correction, $$Ia=(Tm-Xm)/Tm \times (Ts-Xm)/Ts \times Io. \quad (6)$$

It is here provided that the product of the distance Tm in the main scanning direction from the evaluation reference plane to the exit pupil and the distance Ts in the sub-scanning direction from the evaluation reference plane to the exit pupil is Kyz, the distance in the main scanning direction from the exit pupil to the evaluation plane is Ly, and the distance in the sub-scanning direction from the exit pupil to the evaluation plane is Lz. It is further provided that the measurement value is Do, and the converted measurement value is D. Thus, Conditional Equation (6) is represented in a following form.

$$D=(Ly \times Lz/Kyz) \times Do \quad (7)$$

In the case where the optical system to be tested has not anamorphic characteristics, provided that $$L=Ly=Lz,$$

$$T=Tm=Tz,$$

$$Kyz=Tm \times Ts \text{ and}$$

K=T×T, Conditional Equation (7) can simply be represented as follows.

$$D=(L \times L/K) \times Do. \quad (7')$$

Variation

In the first embodiment, the measurement value is the width of LSF. In the second embodiment, the measurement value is the maximum intensity of LSF. In the third embodiment, the measurement value is the maximum intensity of PSF. Instead, the measurement value may be the width of PSF. In the case of using the width of PSF as the measurement value, Conditional Equation (1) and (2) can be used for correcting the measurement value as with the first embodiment.

In the second and third embodiments, the measurement value is the maximum intensity as the light intensity. Instead, the measurement value may be an average intensity. In the first to third embodiments, the correction is performed according to the distance between the exit pupil of the optical system to be tested and the evaluation plane. The correction may be performed according to, for instance, the distance between a rear side end of the optical system to be tested (instead of the exit pupil position of the optical system to be tested) and the evaluation plane.

In the first embodiment, the correction qualitatively using Conditional Equations (1) and (2) is described. However, the present invention is not limited thereto. That is, any correction can be performed only provided that, qualitatively using the image plane as the reference plane, when the evaluation plane approaches the optical system to be tested, the measurement value increases according to the approaching amount, and, when the evaluation plane moves apart from the optical system to be tested, the measurement value decreases according to the amount of moving apart.

Likewise, in the second and third embodiments, the correction qualitatively using Conditional Equations (4) and (5) or Conditional Equations (6), (7) and (7') is described. The present invention is not limited thereto. That is, any correction can be performed only provided that, qualitatively using image plane as the reference plane, when the evaluation plane approaches the optical system to be tested, the measurement value decreases according to the approaching amount, and, when the evaluation plane moves apart from the optical system to be tested, the measurement value increases according to the amount of moving apart.

The present invention can correctly acquire the best image plane position of the optical system to be tested only with the arithmetic process of the measurement value, basically without any change in configuration of the conventional apparatus. Accordingly, the target values for correcting the mold and lens become correct. As a result, development efficiency and quality of components, units and products are improved, and the cost is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-082796, filed Apr. 4, 2011, which is hereby incorporated by reference herein in its entirety.

What is claimed is:

1. A measurement apparatus comprising:
   a correction unit comprising a processor that executes:
   a first task that measures a spread distribution of a beam by an optical system to be tested on a plurality of evaluation planes in proximity of an image plane of the optical system to be tested; and
   a second task that corrects a measurement value acquired by the first task; and
   a third task that acquires an optical characteristic of the optical system to be tested based on a corrected value acquired by the second task.

2. The measurement apparatus according to claim 1, wherein:
   the measurement value pertains to a value of a width of the spread distribution, and
   the second task:
   in a case where the plurality of evaluation planes are closer to the system to be tested than the image plane, outputs the corrected value, which is the measurement value increased according to a distance between the image plane and the plurality of evaluation planes; and
   in a case where the plurality of evaluation planes are farther from the system to be tested than the image plane, outputs the corrected value, which is the measurement value decreased according to the distance between the image plane and the plurality of evaluation planes.

3. The measurement apparatus according to claim 1, wherein:
   the measurement value pertains to a light intensity of the spread distribution, and
   the second task:
   in a case where the plurality of evaluation planes are closer to the system to be tested than the image plane, outputs the corrected value, which is the measurement value decreased according to a distance between the image plane and the plurality of evaluation planes; and
   in a case where the plurality of evaluation planes are farther from the system to be tested than the image plane, outputs the corrected value, which is the measurement value increased according to the distance between the image plane and the plurality of evaluation planes.

4. The apparatus according to claim 3, wherein the light intensity is the maximum intensity of the spread distribution.

5. The apparatus according to claim 1, wherein the correction unit further provides a fourth task that outputs a corrected value, which is the measurement value changed according to a distance between an exit pupil of the optical system to be tested and the plurality of evaluation planes.

6. The apparatus according to claim 1, wherein the correction unit further provides a fourth task that outputs a different corrected value in a first direction and a second direction, which are perpendicular to an optical axis of the optical system to be tested and orthogonal to each other.

7. The apparatus according to claim 2, wherein the following equation is satisfied:

$$D=(K/L) \times Do,$$

where the measurement value is Do, a distance between an exit pupil of the optical system to be tested and the image plane is K, a distance between the exit pupil of the optical system to be tested and an evaluation plane, among the plurality of planes, is L, and a corrected value after correction is D.

8. The apparatus according to claim 3, wherein the following equation is satisfied:

$$D=(L/K) \times Do,$$

where the measurement value is Do, a distance between an exit pupil of the optical system to be tested and the image plane is K, a distance between the exit pupil of the optical system to be tested and an evaluation plane, among the plurality of planes, is L, and a corrected value after correction is D.

9. The apparatus according to claim 3, wherein the following equation is satisfied:

$$D=(L \times L/K) \times Do,$$

where the measurement value is Do, a distance between an exit pupil of the optical system to be tested and the image plane is K, a distance between the exit pupil of the optical system to be tested and an evaluation plane, among the plurality of planes, is L, and a corrected value after correction is D.

10. The apparatus according to claim 3, wherein the following equation is satisfied:

$$D=(Ly \times Lz/Kyz) \times Do,$$

where the measurement amount is Do, a product of a distance between a first exit pupil of the optical system to be tested and the image plane in a first direction and a distance between a second exit pupil of the optical system to be tested and the image plane in a second direction, which is perpendicular to the first direction, is Kyz, a distance between the first exit pupil and an evaluation plane, among the plurality of evaluation plane, is Ly, and a distance between the second exit pupil and the evaluation plane is Lz.

11. The apparatus according to claim 6, wherein the optical system to be tested is an anamorphic optical system that comprises exit pupils disposed at different positions in the first direction and the second direction.

12. The method of measuring an optical characteristic of an optical system to be tested, the method comprising:
    a first step of measuring a spread distribution of a beam by the optical system to be tested on a plurality of evaluation planes in proximity of an image plane of the optical system to be tested;
    a second step of correcting a measurement value acquired in the first step; and
    a third step of acquiring an optical characteristic of the optical system to be tested according to a corrected value acquired in the second step.

13. The method for measuring according to claim 12, wherein:
    the measurement value pertains to a value of a width of the spread distribution, and
    the second step:
    in a case where the plurality of evaluation planes are closer to the system to be tested than the image plane, outputs the corrected value, which is the measurement value increased according to a distance between the image plane and the plurality of evaluation planes; and
    in a case where the plurality of evaluation planes are farther from the system to be tested than the image plane, outputs the corrected value, which is the measurement value decreased according to the distance between the image plane and the plurality of evaluation planes.

14. The method for measuring according to claim 12, wherein:
    the measurement value pertains to a light intensity of the spread distribution, and
    the second step:
    in a case where the plurality of evaluation planes are closer to the system to be tested than the image plane, outputs the corrected value, which is the measurement value decreased according to a distance between the image plane and the plurality of evaluation planes; and
    in a case where the plurality of evaluation planes are farther from the system to be tested than the image plane, outputs the corrected value, which is the measurement value increased according to the distance between the image plane and the plurality of evaluation planes.

15. The method for measuring according to claim 12, wherein the second step performs a different correction in a first direction and a second direction, which are perpendicular to an optical axis of the optical system to be tested and orthogonal to each other.

16. The method for manufacturing an optical system to be tested, the method comprising:
    a first step of measuring a spread distribution of a beam by the optical system to be tested on a plurality of evaluation planes in proximity of an image plane of the optical system to be tested;
    a second step of correcting a measurement value acquired in the first step;
    a third step of acquiring an optical characteristic of the optical system to be tested according to a corrected value acquired in the second step; and
    a fourth step of correcting a shape of the optical system to be tested according to the optical characteristic acquired in the third step.

17. The method for manufacturing according to claim 16, wherein:
    the measurement value pertains to a value of a width of the spread distribution, and
    the second step:
    in a case where the plurality of evaluation planes are closer to the system to be tested than the image plane, outputs the corrected value, which is the measurement value increased according to a distance between the image plane and the plurality of evaluation planes; and
    in a case where the plurality of evaluation planes are farther from the system to be tested than the image plane, outputs the corrected value, which is the measurement value decreased according to the distance between the image plane and the plurality of evaluation planes.

18. The method for manufacturing according to claim 16, wherein:
    the measurement value pertains to a light intensity of the spread distribution, and
    the second step:
    in a case where the plurality of evaluation planes are closer to the system to be tested than the image plane, outputs the corrected value, which is the measurement value is decreased according to a distance between the image plane and the plurality of evaluation planes; and
    in a case where the plurality of evaluation planes are farther from the system to be tested than the image plane, outputs the corrected value, which is the measurement value increased according to the distance between the image plane and the plurality of evaluation planes.

19. The method for manufacturing according to claim 16, wherein the second step performs a different correction in a first direction and a second direction, which are perpendicular to an optical axis of the optical system to be tested and orthogonal to each other.

* * * * *